United States Patent
Fukuda et al.

(10) Patent No.: US 11,111,419 B2
(45) Date of Patent: Sep. 7, 2021

(54) PHOTOCROSSLINKABLE TRANSPARENT ADHESIVE MATERIAL, TRANSPARENT ADHESIVE MATERIAL LAYERED BODY, AND LAYERED BODY FOR CONSTITUTING OPTICAL DEVICE

(71) Applicant: Mitsubishi Chemical Corporation, Tokyo (JP)

(72) Inventors: Shinya Fukuda, Nagahama (JP); Makoto Inenaga, Nagahama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 728 days.

(21) Appl. No.: 15/507,645

(22) PCT Filed: Sep. 17, 2015

(86) PCT No.: PCT/JP2015/076480
§ 371 (c)(1),
(2) Date: Feb. 28, 2017

(87) PCT Pub. No.: WO2016/043268
PCT Pub. Date: Mar. 24, 2016

(65) Prior Publication Data
US 2017/0292046 A1 Oct. 12, 2017

(30) Foreign Application Priority Data
Sep. 18, 2014 (JP) .............................. JP2014-189989

(51) Int. Cl.
*C08F 210/16* (2006.01)
*C09J 123/08* (2006.01)
(Continued)

(52) U.S. Cl.
CPC ........... *C09J 123/0815* (2013.01); *B32B 7/02* (2013.01); *B32B 7/04* (2013.01); *B32B 7/06* (2013.01); *B32B 7/12* (2013.01); *B32B 25/04* (2013.01); *B32B 25/08* (2013.01); *B32B 25/14* (2013.01); *B32B 25/16* (2013.01); *B32B 27/00* (2013.01); *B32B 27/06* (2013.01); *B32B 27/08* (2013.01); *B32B 27/16* (2013.01); *B32B 27/285* (2013.01); *B32B 27/30* (2013.01); *B32B 27/302* (2013.01); *B32B 27/306* (2013.01); *B32B 27/308* (2013.01); *B32B 27/32* (2013.01); *B32B 27/325* (2013.01); *B32B 27/34* (2013.01); *B32B 27/36* (2013.01); *C08J 3/243* (2013.01); *C09J 7/10* (2018.01); *C09J 123/26* (2013.01); *C09J 133/064* (2013.01); *G02B 1/115* (2013.01); *B32B 2250/03* (2013.01); *B32B 2250/04* (2013.01); *B32B 2250/05* (2013.01); *B32B 2255/10* (2013.01); *B32B 2264/02* (2013.01); *B32B 2264/10* (2013.01); *B32B 2270/00* (2013.01); *B32B 2307/20* (2013.01); *B32B 2307/306* (2013.01); *B32B 2307/308* (2013.01); *B32B 2307/3065* (2013.01); *B32B 2307/412* (2013.01); *B32B 2307/546* (2013.01); *B32B 2307/712* (2013.01); *B32B 2307/72* (2013.01); *B32B 2307/7246* (2013.01); *B32B 2307/732* (2013.01); *B32B 2307/748* (2013.01); *B32B 2405/00* (2013.01); *B32B 2457/00* (2013.01); *B32B 2457/206* (2013.01); *B32B 2457/208* (2013.01); *C08F 222/102* (2020.02); *C08J 2323/06* (2013.01); *C08J 2323/12* (2013.01); *C09J 2203/318* (2013.01); *C09J 2301/1242* (2020.08); *C09J 2301/312* (2020.08);
(Continued)

(58) Field of Classification Search
CPC .............................. C09J 123/0815; C09J 7/10
See application file for complete search history.

(56) References Cited

U.S. PATENT DOCUMENTS 4,612,252 A * 9/1986 Sagane ................... B32B 27/04
428/516
4,880,873 A * 11/1989 Sagane ................... C08J 5/124
525/61
(Continued)

FOREIGN PATENT DOCUMENTS

CN 103582685 A 2/2014
CN 105452410 A 3/2016
(Continued)

OTHER PUBLICATIONS

Combined Chinese Office Action and Search Report dated Jul. 3, 2019, in Patent Application No. 201580042257.6, 16 pages (with English translation and English translation of Category of Cited Documents).
(Continued)

*Primary Examiner* — Leith S Shafi
*Assistant Examiner* — Nicholas R Krasnow
(74) *Attorney, Agent, or Firm* — Oblon, McClelland, Maier & Neustadt, L.L.P.

(57) ABSTRACT

Provided is a novel transparent adhesive material having low relative permittivity as well as excellent adhesive characteristics, whereby an olefinic polymer resin layer and an acrylic polymer adhesive layer can be suitably integrated. Suggested is a transparent adhesive material provided with an outermost surface layer containing an acrylic polymer (B) and a photocrosslinking initiator, and an intermediate layer containing an olefinic polymer (A), a crosslinking agent, and a photocrosslinking initiator, in which the intermediate layer contains a (meth)acrylate monomer as the crosslinking agent.

15 Claims, No Drawings

(51) Int. Cl.

| | | |
|---|---|---|
| *B32B 27/00* | (2006.01) | |
| *B32B 27/30* | (2006.01) | |
| *C09J 133/06* | (2006.01) | |
| *C09J 7/10* | (2018.01) | |
| *B32B 25/14* | (2006.01) | |
| *B32B 25/16* | (2006.01) | |
| *B32B 7/04* | (2019.01) | |
| *B32B 27/36* | (2006.01) | |
| *B32B 27/06* | (2006.01) | |
| *B32B 7/06* | (2019.01) | |
| *B32B 27/28* | (2006.01) | |
| *B32B 27/32* | (2006.01) | |
| *B32B 7/12* | (2006.01) | |
| *B32B 27/34* | (2006.01) | |
| *B32B 27/16* | (2006.01) | |
| *B32B 25/08* | (2006.01) | |
| *B32B 25/04* | (2006.01) | |
| *B32B 7/02* | (2019.01) | |
| *B32B 27/08* | (2006.01) | |
| *C08J 3/24* | (2006.01) | |
| *C09J 123/26* | (2006.01) | |
| *G02B 1/115* | (2015.01) | |
| *C08F 222/10* | (2006.01) | |

(52) U.S. Cl.
CPC ...... *C09J 2301/416* (2020.08); *C09J 2423/00* (2013.01); *C09J 2423/04* (2013.01); *C09J 2433/00* (2013.01)

(56) References Cited

U.S. PATENT DOCUMENTS

| | | | | |
|---|---|---|---|---|
| 5,965,255 A | * | 10/1999 | Ichimura | B32B 25/04 428/353 |
| 6,420,046 B1 | * | 7/2002 | Shah | B32B 27/08 428/475.5 |
| 6,958,186 B2 | * | 10/2005 | Husemann | C09J 7/25 428/346 |
| 2002/0012801 A1 | * | 1/2002 | Oreins | C08L 2666/02 428/421 |
| 2002/0094444 A1 | * | 7/2002 | Nakata | C05G 5/40 428/480 |
| 2002/0187323 A1 | * | 12/2002 | Yamamoto | C09J 7/29 428/213 |
| 2003/0077442 A1 | * | 4/2003 | Inokuchi | B32B 7/06 428/352 |
| 2004/0126576 A1 | * | 7/2004 | Kinning | C09J 7/401 428/352 |
| 2006/0251888 A1 | * | 11/2006 | Lane | B32B 7/06 428/343 |
| 2006/0251889 A1 | * | 11/2006 | Lane | C09J 7/22 428/343 |
| 2006/0251890 A1 | * | 11/2006 | Lane | C09J 7/38 428/343 |
| 2006/0263596 A1 | * | 11/2006 | Bamborough | B32B 7/06 428/354 |
| 2010/0139707 A1 | * | 6/2010 | Boonstra | B32B 7/12 134/29 |
| 2010/0304104 A1 | | 12/2010 | Nagasaki et al. | |
| 2013/0302602 A1 | * | 11/2013 | Takeda | C09J 123/14 428/354 |
| 2014/0044961 A1 | | 2/2014 | Takami et al. | |
| 2014/0050874 A1 | * | 2/2014 | Takeda | C09J 123/16 428/41.3 |
| 2014/0093726 A1 | | 4/2014 | Higashi et al. | |
| 2016/0032154 A1 | * | 2/2016 | Kanno | C09J 133/08 525/100 |
| 2016/0208148 A1 | | 7/2016 | Niimi et al. | |

FOREIGN PATENT DOCUMENTS

| | | | |
|---|---|---|---|
| JP | 2000-104038 A | | 4/2000 |
| JP | 2009-132038 A | | 6/2009 |
| JP | 2012-41372 A | | 3/2012 |
| JP | 2012/172004 A | | 9/2012 |
| JP | 2012-173354 A | | 9/2012 |
| JP | 2012-229358 A | | 11/2012 |
| JP | 2013-1761 A | | 1/2013 |
| JP | 2013-235089 A | | 11/2013 |
| JP | 2014125511 A | * | 7/2014 |
| TW | 201410817 A | | 3/2014 |
| TW | 201435022 A | | 9/2014 |
| WO | 2010/027041 A1 | | 3/2010 |

OTHER PUBLICATIONS

International Search Report dated Dec. 15, 2015 in PCT/JP2015/076480 filed Sep. 17, 2015.
Combined Taiwanese Office Action and Search Report dated Jan. 4, 2019 in Patent Application No. 104131033 (with English translation), 9 pages.

* cited by examiner

PHOTOCROSSLINKABLE TRANSPARENT ADHESIVE MATERIAL, TRANSPARENT ADHESIVE MATERIAL LAYERED BODY, AND LAYERED BODY FOR CONSTITUTING OPTICAL DEVICE

TECHNICAL FIELD

The present invention relates to a transparent adhesive material having low permittivity as well as excellent adhesive characteristics. In particular, the invention relates to a transparent adhesive material which can be suitably used for attachment of devices such as an optical device including a mobile terminal (PDA) like a smart phone, a tablet computer, a personal computer (PC), a game machine, a television (TV), a car navigation system, a touch panel, a pen tablet, and an organic EL element, or a solar cell module like an organic thin film and a pigment sensitization, or members constituting module, and relates to a transparent adhesive material layered body and a layered body for constituting an optical device using the transparent adhesive material.

BACKGROUND ART

Conventionally, in order to improve the visibility of an optical device, a gap between an image display panel such as a liquid crystal display (LCD), a plasma display panel (PDP), or an electroluminescence display (ELD) and a member of a protective panel or touch panel, which is disposed on the front side (viewing side) thereof, is filled with an adhesive sheet or an liquid-phase adhesive so as to suppress the reflection of incident light or light emitted from a display image at an air layer interface.

As a method for filling the gap between members for constituting those optical devices with an adhesive, a method of filling a liquid-phase adhesive resin composition containing an UV ray curable resin in the gap and performing irradiation of ultraviolet ray for curing is known (Patent Document 1).

In recent years, thinning and reducing weight are in progress in the field of an optical device, in particular, a cellular phone, a portable terminal, or the like, and new problems arise accordingly. Namely, in an optical device provided with a touch sensor function, in particular, a touch function of capacitance type which is widely distributed, the capacitance of a capacitor which is formed between two electrodes that face each other via an insulating film changes according to touch of a conductor like a finger at a surface protective panel side to detect the position. However, according to the thinning of a member, a gap between the electrode and protective panel surface is reduced and the change in capacitance responding to touch increases, and thus a problem arises in that noise easily occurs in detection signal.

Furthermore, in addition to the thinning and reducing weight of a member, thinning of a filling member used for integration of a member like adhesive sheet is also required due to shrinking gaps among the members. As such, for absorbing a change in sensitivity of touch detection that is caused by a member or thinning of the sheet itself, there is a need for the adhesive sheet used for filling a gap between an electrode and a surface protective panel to have low permittivity.

Furthermore, in view of the reducing weight or cost of an electrode, as an electrode substrate, glass is currently being replaced with a resin film. In the case of an electrode in which a conductive film is formed by pattern forming only on a single surface, it is necessary to layer two film electrodes or a glass electrode and a film electrode via an adhesive sheet or the like, and it is also required that an adhesive material layer used for such case has low relative permittivity.

As an adhesive material with low relative permittivity, an adhesive sheet for optical use using a composition which contains a monomer component including specific (meth) acrylic acid alkyl ester with a relatively long-chain alkyl group or alicyclic hydrocarbon group is disclosed in Patent Document 2, for example.

In Patent Document 3, an adhesive composition with low permittivity using an acrylic ester copolymer which is obtained by copolymerization of a methacrylic acid ester monomer having specific carbon atom number in a side chain, in which the adhesive composition is particularly suitable for attachment of a touch panel, is disclosed.

In Patent Document 4, as a composition for an adhesive sheet by which an adhesive sheet with low permittivity and low dissipation factor can be formed, a composition for an adhesive sheet containing an elastomer which consists of polyphenylene ether and a styrene butadiene copolymer and triallyl isocyanurate is disclosed.

In Patent Document 5, a thermoplastic resin composition which has a polyphenylene ether-based polymer having hydroxyl groups in the chemical structure thereof and having 2,6-dimethylphenylene ether as a repeating unit, any one of an isocyanate compound having plural isocyanate groups in the structure thereof and a hydrogenated styrene-based elastomer, or a reaction product thereof is disclosed.

CITATION LIST

Patent Document

Patent Document 1: WO 2010/027041 A
Patent Document 2: JP 2012-173354 A
Patent Document 3: JP 2013-001761 A
Patent Document 4: JP 2000-104038 A
Patent Document 5: JP 2012-041372 A

SUMMARY OF THE INVENTION

Problem to be Solved by the Invention

An olefinic polymer having no highly polar group such as polyethylene or polypropylene is known with electrical characteristics that it has low relative permittivity and excellent dielectric characteristics, in particular. As such, an adhesive material containing the aforementioned olefinic polymer as a main component is known to exhibit excellent dielectric characteristics.

However, the adhesive material containing the olefinic polymer as a main component has a relatively low adhesion property in general and thus does not have sufficient adhesion property for attachment of a member which constitutes an optical device as described above.

As a method for solving the above problems, it may be considered to layer an adhesive layer having an acrylic polymer as a main component on one side or both sides of a resin layer which contains an olefinic polymer as a main component.

However, as the olefinic polymer and the acrylic polymer are the materials that are intrinsically difficult to attach, there is a problem that, when a resin layer containing an olefinic polymer as a main component and an adhesive layer containing an acrylic polymer as a main component are desired to be layered, it remains difficult to achieve the integration.

Accordingly, in order to provide a transparent adhesive material having low relative permittivity as well as excellent adhesive characteristics, the invention is intended to provide a novel transparent adhesive material having a constitution that an adhesive layer containing an acrylic polymer as a main component is layered on one side or both sides of a resin layer containing an olefinic polymer as a main component, whereby the resin layer containing an olefinic polymer as a main component and the adhesive layer containing acrylic polymer as a main component can be suitably integrated.

Means for Solving Problem

Suggested by the invention is a photocrosslinkable transparent adhesive material provided with an outermost surface layer containing an acrylic polymer (B) and a photocrosslinking initiator, and an intermediate layer containing an olefinic polymer (A), a crosslinking agent, and a photocrosslinking initiator, in which the intermediate layer contains a (meth)acrylate monomer as the crosslinking agent.

Also suggested by the invention is a transparent adhesive material provided with an outermost surface layer containing a photoreaction product of an acrylic polymer (B), and an adjacent intermediate layer containing a photoreaction product of an olefinic polymer (A), in which relative permittivity is 3.3 or less at a frequency of from 100 kHz to 1 MHz.

Effect of the Invention

In the photocrosslinkable transparent adhesive material suggested by the invention, an intermediate layer containing an olefinic polymer (A) is used, and thus the adhesive material as a whole can have lowered relative permittivity.

Furthermore, as the photocrosslinkable transparent adhesive material is provided with an outermost surface layer containing an acrylic polymer (B) and a photocrosslinking initiator, the adhesive characteristics can be enhanced compared to a monolayer adhesive material containing the olefinic polymer (A) as a main component. Further, in view of the history of a related art, it can be used for attachment of a member for constituting an optical device.

Furthermore, in the photocrosslinkable transparent adhesive material that is suggested by the invention, by adjusting the 130° C. melt viscosity of a resin composition for constituting the intermediate layer containing an olefinic polymer (A) and the same of a resin composition for constituting the outermost surface layer containing an acrylic polymer (B) to be within a predetermined range, the resin compositions can be heated and melt at the same temperature. Accordingly, it is possible to perform coextrusion, for example, and the interface adhesiveness between the two layers can be enhanced.

In that case, by containing a (meth)acrylate monomer as a crosslinking agent in the above intermediate layer, the (meth)acrylate monomer in the intermediate layer can diffuse and permeate into the outermost surface layer containing an acrylic polymer (B) or an interaction of the outermost surface layer occurs according to a reaction of the crosslinking agent contained in the intermediate layer when a crosslinking reaction is allowed to occur by irradiation of light, and thus the interface adhesiveness between the two layers can be further enhanced.

MODE(S) FOR CARRYING OUT THE INVENTION

Hereinbelow, an example of embodiments of the invention is described in detail. However, it is evident that the invention is not limited to the following embodiments.

<Present Transparent Adhesive Material>

The photocrosslinkable transparent adhesive material according to this embodiment (hereinbelow, referred to as "the present transparent adhesive material") is a transparent adhesive material provided with an outermost surface layer containing an acrylic polymer (B) and a photocrosslinking initiator, and an intermediate layer containing an olefinic polymer (A), a crosslinking agent, and a photocrosslinking initiator.

As for the present transparent adhesive material, it is preferable that 130° C. melt viscosity $\eta$ of the resin composition for constituting the above outermost surface layer and the above intermediate layer is $5 \times 10^1$ to $5 \times 10^3$ Pa·s and the ratio $\eta_a/\eta_b$ between melt viscosity $\eta_a$ of the outermost surface layer and melt viscosity $\eta_b$ of the intermediate layer is 0.05 to 20.

As the 130° C. melt viscosity $\eta_b$ of the resin composition for constituting the intermediate layer containing the olefinic polymer (A) and the 130° C. melt viscosity $\eta_a$ of the resin composition for constituting the outermost surface containing the acrylic polymer (B) are adjusted to be within a predetermined range, similar viscosity characteristics can be exhibited at the same temperature. Thus, for example, as the adhesion property between the layers is enhanced during integration by coextrusion or thermal lamination, the interface adhesiveness between the two layers can be enhanced.

From the above point of view, the 130° C. melt viscosity $\eta$ of the resin composition for constituting the outermost surface layer and the intermediate layer is preferably $5 \times 10^1$ to $5 \times 10^3$ Pa·s. As it is $5 \times 10^1$ Pa·s or more, preparing a sheet by heating can be easily achieved, and as it is $5 \times 10^3$ Pa·s or less, the adhesion property between the layers can be maintained and it is easy to have integration by layering, and therefore desirable. In particular, it is preferable that the 130° C. melt viscosity $\eta$ is $7 \times 10^1$ Pa·s or more or $3 \times 10^3$ Pa·s or less, and more particularly, $1 \times 10^2$ Pa·s or more or $1 \times 10^3$ Pa·s or less.

Furthermore, from the same point of view as above, it is preferable that the ratio $\eta_a/\eta_b$ between the outermost surface layer melt viscosity $\eta_a$ and the intermediate layer melt viscosity $\eta_b$ of the resin composition for constituting the outermost surface layer and the intermediate layer is preferably 0.05 to 20. In particular, it is more preferably 0.07 or more or 15 or less, even more preferably 0.1 or more or 10 or less, and still even more preferably 0.2 or more or 5 or less.

As a method for adjusting the 130° C. melt viscosity of the resin composition for constituting the intermediate layer containing the olefinic polymer (A) and the 130° C. melt viscosity of the resin composition for constituting the outermost surface containing the acrylic polymer (B), there is a method of adjusting the molecular weight of the resin, which is a main component of each resin composition, that is, the olefinic polymer (A) and the acrylic polymer (B).

From the above point of view, the weight average molecular weight (Mw) of the olefinic polymer (A) is 50,000 to 400,000, preferably 60,000 or more to 200,000 or less, and more preferably 70,000 or more or 150,000 or less.

Meanwhile, the weight average molecular weight (Mw) of the acrylic polymer (B) is 100,000 to 800,000, preferably 150,000 or more to 550,000 or less, and more preferably 200,000 or more or 500,000 or less.

It is also possible to adjust the melt viscosity by increasing or decreasing the blending amount of other addition components such as a crosslinking agent or a photocrosslinking initiator. The preferred composition and addition amount of addition components will be described later.

<Intermediate Layer>

The intermediate layer is described hereinbelow.

The intermediate layer is a layer which contains at least the olefinic polymer (A), a crosslinking agent, and a photocrosslinking initiator.

It is preferable that the intermediate layer has relative permittivity of 3.0 or less at a frequency of from 100 kHz to 1 MHz or less.

As the intermediate layer has the relative permittivity within the above range, it becomes easier to provide the present transparent adhesive material with excellent electrical characteristics.

From the above point of view, the relative permittivity of the intermediate layer is preferably 3.0 or less, more preferably 2.8 or less, and even more preferably 2.6 or less at a frequency of from 100 kHz to 1 MHz or less.

Furthermore, to adjust the relative permittivity of the intermediate layer to be within the above range, it is preferable to select and use a resin described below as the olefinic polymer (A).

(Olefinic Polymer (A))

Examples of the olefinic polymer (A) which is used for the intermediate layer include an ethylene-α-olefin copolymer, a styrene-based elastomer, a polyisobutylene resin, a polybutene resin, a polybutadiene resin, a polyisoprene resin, and an ethylene•cyclic olefin copolymer, and it is also preferable to use it either singly or in combination of two or more types thereof.

Among them, from the viewpoint of the electrical characteristics, water vapor barrier property, transparency, flexibility, sheet processability, weather resistance and reliability, or the like of a transparent adhesive material, it is particularly preferable to use any one type of an ethylene-α-olefin copolymer, a styrene-based elastomer, and a polyisobutylene resin, or combination of two or more types of them.

In that case, it is also possible to use combination of two or more types of the olefinic polymer with different composition or different molecular weight.

It is sufficient for the above "ethylene-α-olefin copolymer" to be a copolymer of ethylene and α-olefin.

Type of the α-olefin to be copolymerized with ethylene is not particularly limited.

In general, α-olefin with carbon atom number of 3 to 20 can be suitably used. Examples thereof include propylene, 1-butene, 1-pentene, 1-hexene, 1-heptene, 1-octene, 1-nonene, 1-decene, 3-methyl-butene-1, and 4-methyl-pentene-1. Among them, from the viewpoint of the ease of industrial obtainability, economic efficiency, or the like, as an α-olefin, a copolymer containing 1-butene, 1-hexene, or 1-octene as a copolymerization component is preferable. In that case, the α-olefin to be copolymerized with ethylene can be used either singly or in combination of two or more types thereof at any ratio.

Furthermore, content of the α-olefin to be copolymerized with ethylene is not particularly limited. For example, relative to the entire monomer used for copolymerization, it is preferably 2% by mol to 40% by mol, more preferably 3% by mol or more or 30% by mol or less, and even more preferably 5% by mol or more or 25% by mol or less. As the content of the α-olefin to be copolymerized with ethylene is within the above range, the crystallinity is reduced due to the copolymerization component and the transparency (for example, total light transmittance, haze, or the like) is enhanced, and therefore desirable. Furthermore, as the content of the α-olefin to be copolymerized with ethylene is within the above range, an occurrence of blocking or the like is suppressed during the production of raw material pellets, and thus desirable.

Furthermore, the type and content of the α-olefin to be copolymerized with ethylene can be analyzed by a known method, for example, by using a nuclear magnetic resonance (NMR) analyzer or other instrumental analyzer.

The aforementioned ethylene-α-olefin copolymer may also contain a monomer unit that is derived from a monomer other than α-olefin.

Examples of the monomer unit include cyclic olefin, a vinyl aromatic compound (styrene or the like), and a polyene compound.

Content of the monomer unit is, when the entire monomer unit in an ethylene-α-olefin copolymer is 100% by mol, preferably 20% by mol or less, and more preferably 15% by mol or less.

Furthermore, the stereo structure, branching, branch distribution, molecular weight distribution, or copolymerization mode (random, block, or the like) of an ethylene-α-olefin copolymer are not particularly limited. However, a copolymer with a long-chain branch, that is, a copolymer having a branch in the main chain itself, has advantages that the mechanical properties are generally favorable and a calender molding property is enhanced due to high melt tension during film molding.

The ethylene-α-olefin copolymer may or may not have a crystal fusion peak. Upper limit of the crystal fusion peak is not particularly limited. Considering the transparency or flexibility at low temperature, it is preferably 100° C. or less, more preferably 80° C. or less, and even more preferably 65° C. or less. Furthermore, lower limit of the crystal fusion peak is, considering prevention of blocking of raw material pellets, handling property of an adhesive material, or shape maintaining performance at room temperature or the like, preferably 20° C. or more, more preferably 30° C. or more, and even more preferably 40° C. or more. Furthermore, there may be plural crystal fusion peaks.

Crystal fusion heat of the ethylene-α-olefin copolymer is not particularly limited. It is preferably 0 to 100 J/g, more preferably 5 J/g or more or 80 J/g or less, and even more preferably 10 J/g or more or 65 J/g or less. As it is within the above range, flexibility, transparency, or the like can be ensured, and thus desirable.

Furthermore, the above crystal fusion peak or crystal fusion heat can be measured by using a differential scanning calorimeter (DSC) at heating rate of 10° C./min in view of JIS K7121.

MFR (JIS K7210: temperature of 190° C. and a load of 21.18 N) of the ethylene-α-olefin copolymer is not particularly limited. It is preferably 5 g/10 min to 60 g/10 min, more preferably 8 g/10 min or more or 50 g/10 min or less, and even more preferably 10 g/10 min or more or 45 g/10 min or less.

As for the ethylene-α-olefin copolymer, an ethylene-α-olefin copolymer with density of 0.850 to 0.900 g/cm$^3$ is preferable to have excellent transparency, low temperature characteristics, or the like. An ethylene-α-olefin copolymer with density of 0.860 to 0.885 g/cm$^3$ (linear shaped low density polyethylene) is more preferable.

Among the ethylene-α-olefin copolymers, an ethylene-α-olefin random copolymer is even more preferable from the viewpoint of having excellent light transmittance and flexibility. They may be used either singly or as a mixture of two or more types thereof.

The method for producing the above ethylene-α-olefin copolymer is not particularly limited and a known polymerization method using a known catalyst for ethylene polymerization can be employed. Examples of a known polymerization method include a slurry polymerization method, a solution polymerization method, a vapor phase polymerization method, or a bulk phase polymerization method using radical initiator in which a multi-site catalyst represented by Ziegler•Natta type catalyst or a single-site catalyst represented by metallocene-based catalyst or a post metallocene-based catalyst is used.

From the viewpoint of having easy granulation (pelletization) after polymerization or prevention of blocking of raw material pellets, it is preferable to have the production by using a polymerization method in which a single-site catalyst allowing less content of low molecular weight component and polymerization of raw materials with narrow molecular weight distribution is used.

Examples of the aforementioned "styrene-based elastomer" include SBR (styrene-butadiene rubber), SIB (styrene-isobutylene rubber), SBS (styrene-butylene-styrene block copolymer), SIS (styrene-isobutylene-styrene block copolymer), SEBS (styrene-ethylene-butylene-styrene block copolymer), SEBC (styrene-ethylene-butylene-ethylene block copolymer), SIB (styrene-isobutylene block copolymer), and HSBR (hydrogenated styrene butadiene rubber).

Content of the styrene in the styrene-based elastomer is not particularly limited. From the viewpoint of weather resistance, for example, it is preferably 20% by mol or less relative to the entire monomer component for constituting the elastomer.

MFR (JIS K7210: temperature of 190° C. and a load of 21.18 N) of the styrene-based elastomer is not particularly limited. It is preferably 5 g/10 min to 100 g/10 min, more preferably 8 g/10 min or more or 80 g/10 min or less, and even more preferably 10 g/10 min or more or 50 g/10 min or less.

It is sufficient that the aforementioned "polyisobutylene resin" is a resin which has a polyisobutylene skeleton in the main chain or side chain. Examples thereof include a homopolymer of an isobutylene monomer, a copolymer of isobutylene and a small amount of isoprene, and a copolymer of isobutylene and n-butane or butadiene.

Viscosity average molecular weight (Mv) of the polyisobutylene resin is not particularly limited. It is preferably 50,000 to 400,000, more preferably 70,000 or more or 300,000 or less, and even more preferably 100,000 or more or 200,000 or less. By having the viscosity average molecular weight (Mv) within the above range, it is easy to satisfy simultaneously the processability, the shape stability of a sheet, heat resistance for practical use or the like.

It is possible that the olefinic polymer (A) has a functional group. By using an olefinic polymer with a functional group, not only the compatibility with additives such as a crosslinking agent and a photocrosslinking initiator or an antioxidant can be enhanced but also the adhesion strength to a subject for adhesion or other layers can be enhanced. Furthermore, although it may be used either singly or in combination with an olefinic polymer having no functional group, considering molding processability during sheet forming, economic efficiency, or the like, it is preferably used in combination with the olefinic polymer having no functional group.

As for the olefinic polymer with a functional group, at least one resin selected from the group consisting of a silane modified olefinic polymer or an acid modified olefinic polymer, an ethylene-vinyl acetate copolymer (EVA), an ethylene-vinyl alcohol copolymer (EVOH), an ethylene-methyl methacrylate copolymer (E-MMA), an ethylene-ethyl acrylate copolymer (E-EAA), and an ethylene-glycidyl methacrylate copolymer (E-GMA) is preferable.

(Crosslinking agent and Photocrosslinking Initiator)

It is preferable for the intermediate layer to contain a crosslinking agent and a photocrosslinking initiator.

As the intermediate layer contains a crosslinking agent and a photocrosslinking initiator, a crosslinking reaction with the olefinic polymer (A) can occur or a network among the crosslinking agent is formed or the like so that storage modulus G' can be enhanced and durability for practical use can be improved. For a long-term reliability test, for example, re-flow and a deviation, peeling, foaming or the like in members to be attached can be suppressed.

It is also preferable that a (meth)acrylate monomer is contained as a crosslinking agent in the intermediate layer. As the (meth)acrylate monomer is contained as a crosslinking agent in the intermediate layer, the (meth)acrylate monomer in the intermediate layer can diffuse and permeate into the outermost surface layer containing the acrylic polymer (B), or, at the time of having a crosslinking reaction by irradiation of light, an interaction of the outermost surface layer occurs according to the reaction of the crosslinking agent that is contained in the intermediate layer, and thus the interface adhesiveness between the two layers can be further increased.

In that case, it is preferable that the (meth)acrylate monomer is contained as a crosslinking agent both in the outermost surface layer and the intermediate layer, and concentration of the (meth)acrylate monomer in the intermediate layer is higher than that in the outermost surface layer. By having so, the (meth)acrylate monomer in the intermediate layer can more easily diffuse and permeate into the outermost surface layer, and thus the interface adhesiveness between the two layers can be further increased.

The crosslinking agent used for the intermediate layer is not particularly limited. For example, various crosslinking agents including monofunctional and multifunctional, functionality of two or more, crosslinking agents such as vinyl ester and (meth)acrylic acid ester which can have a radical crosslinking reaction can be used.

Among them, considering the compatibility with the olefinic polymer (A), transparency of an adhesive material, or the like, it is preferable to select and use a linear aliphatic-based, a cyclic aliphatic-based, or an aromatic-based crosslinking agent. In particular, it is more preferable to use an aliphatic-based crosslinking agent with carbon atom number of 6 or more or a cyclic aliphatic-based crosslinking agent. By using those crosslinking agents, mixing with the olefinic polymer (A) is more easily achieved so that a deterioration of the adhesive material like phase separation, a decrease in the transparency, or the like can be suppressed.

Content of the crosslinking agent is, relative to 100 parts by mass of the olefinic polymer, 1 to 50 parts by mass, preferably 1 to 20 parts by mass, and more preferably 1 to 10 parts by mass.

Specific examples of the crosslinking agent which is used for the intermediate layer include isobornyl (meth)acrylate, lauryl (meth)acrylate, stearyl (meth)acrylate, 1,6-hexanediol di(meth)acrylate, 1,8-octanediol di(meth)acrylate, 1,9-nonanediol di(meth)acrylate, 1,10-decanediol di(meth)acrylate, 1,12-dodecanediol di(meth)acrylate, butylethylpropanediol diacrylate, and tricyclodecane dimethanol di(meth) acrylate. Those crosslinking agents may be used either singly or in combination of two or more types thereof. When two or more types of the crosslinking agent are used, it is preferable to use monofunctional (meth)acrylate in combination with multifunctional (meth)acrylate. Accordingly, it is possible to suppress the shrinkage during photocuring or control the compatibility with the olefinic polymer (A).

The photocrosslinking initiator in the intermediate layer can be used to play a role of a radical generator for having a radical crosslinking reaction of the crosslinking agent when light irradiation is carried out over a subject for adhesion after attachment of the aforementioned adhesion material.

By using the photocrosslinking initiator, photocuring can be achieved within a short time at low temperature. Accordingly, a damage on a member which constitutes an optical device as a member for adhesion can be sufficiently avoided.

As for the photocrosslinking initiator, only one type or a mixture of two or more types of a cleave type photocrosslinking initiator which can initiate the reaction with ultraviolet rays or visible light or a hydrogen withdrawing type photocrosslinking initiator can be used.

Type of the photocrosslinking initiator is not particularly limited.

Examples of the cleave type photocrosslinking initiator include benzoin isobutyl ether, benzyl methyl ketal, and 2-hydroxyacetophenone.

Examples of the hydrogen withdrawing type photocrosslinking initiator include benzophenone, Michler's ketone, 2-ethyl anthraquinone, thioxanthone and derivatives thereof.

Content of the photocrosslinking initiator is, relative to 100 parts by mass of the olefinic polymer (A), preferably 0.3 to 10 parts by mass, more preferably 0.5 part by mass or more or 3 parts by mass or less, and even more preferably 1.5 parts by mass or less.

(Other Resins)

For the purpose of further improving the physical properties (flexibility, heat resistance, transparency, adhesion properties, and the like), molding processability, economic efficiency, or the like, the composition for forming the intermediate layer may contain a resin other than the above olefinic polymer (A), crosslinking agent, and photocrosslinking initiator. Examples thereof may include an ionomer resin, a tackifying resin, and the like.

Examples of the type of the aforementioned "ionomer resin" may include an ionically crosslinkable ethylene-methacrylic acid copolymer or an ionically crosslinkable ethylene-acrylic acid copolymer. The method for producing the ionomer resin is not particularly limited. For example, it can be carried out by neutralizing at least a portion of the unsaturated carboxylic acid component of a copolymer composed of ethylene, an unsaturated carboxylic acid, and another unsaturated compound as an optional component with at least either one of a metal ion or an organic amine. In addition, the ionomer resin can be obtained, for example, by saponifying at least a portion of the unsaturated carboxylic acid ester component of a copolymer composed of ethylene, an unsaturated carboxylic acid ester, and another unsaturated compound as an optional component. Specific examples thereof may include "HIMILAN" of a trade name manufactured by DU PONT-MITSUI POLYCHEMICALS CO., LTD.

Examples of the aforementioned "tackifying resin" may include a petroleum resin, a terpene resin, a coumarone-indene resin, a rosin-based resin, or any hydrogenated derivative thereof. Examples of the petroleum resin may include an alicyclic petroleum resin from cyclopentadiene or a dimer thereof, or an aromatic petroleum resin from a C9 component. Examples of the terpene resin may include a terpene resin from β-pinene or a terpene-phenol resin. Examples of the coumarone-indene resin may include a coumarone-indene copolymer and a coumarone-indene-styrene copolymer. In addition, examples of the rosin-based resin may include a rosin resin such as gum rosin and wood rosin, and an esterified rosin resin that is modified with glycerol, pentaerythritol, or the like. The content of the tackifying resin is preferably 20 parts by mass or less and more preferably 10 parts by mass or less relative to 100 parts by mass of the resin composition which constitutes the intermediate layer.

(Additives)

The intermediate layer may be added with various additives, if necessary.

Examples of the additives may include a silane coupling agent, an anti-oxidant, a weather resistant stabilizer, a processing aid, a nucleating agent, an ultraviolet absorber, a flame retardant, and a discoloration preventing agent. These additives may be used singly or in combination of two or more types thereof. Among them, a silane coupling agent, an anti-oxidant, a weather resistant stabilizer, and a processing aid will be described below.

(Silane Coupling Agent)

The silane coupling agent is useful for improving the adhesion property to the outermost surface layer or a peripheral member which constitutes an optical device, and examples thereof may include a compound having an unsaturated group such as a vinyl group, acryloxy group, or a methacryloxy group, and a hydrolyzable functional group such as an alkoxy group as well as an amino group, an epoxy group, or the like. Specific examples of the silane coupling agent may include N-(β-aminoethyl)-γ-aminopropyltrimethoxysilane, N-(β-aminoethyl)-□γ-aminopropylmethyldimethoxysilane, γ-aminopropyltriethoxysilane, γ-glycidoxypropyltrimethoxysilane, and γ-methacryloxypropyltrimethoxysilane.

Among them, in the present transparent adhesive material, γ-glycidoxypropyltrimethoxysilane or γ-methacryloxypropyltrimethoxysilane can be preferably used from the viewpoint of favorable adhesion properties, decreased discoloration such as yellowing, and the like. One type of the silane coupling agents may be used singly or two or more types thereof may be used in combination.

The addition amount of the silane coupling agent is preferably from about 0.1 to 5 parts by mass or so and more preferably from 0.2 to 3 parts by mass relative to 100 parts by mass of the resin composition for constituting the intermediate layer. In addition, a coupling agent such as an organic titanate compound can also be effectively used in the same manner as the silane coupling agent.

(Anti-Oxidant)

The anti-oxidant is not particularly limited, and various commercially available products can be applied. Examples of the anti-oxidant may include various types of anti-oxidants such as a phenol-based anti-oxidant including a monophenol-based anti-oxidant, a bisphenol-based anti-oxidant, and a polymer-type phenol-based anti-oxidant, a sulfur-based anti-oxidant, and a phosphite-based anti-oxidant.

Examples of the monophenol-based anti-oxidant may include 2,6-di-tert-butyl-p-cresol, butylated hydroxyanisole, 2,6-di-tert-butyl-4-ethylphenol, and octadecyl-3-(3,5-di-tert-butyl-4-hydroxyphenyl)propionate.

Examples of the bisphenol-based anti-oxidant may include 2,2'-methylene-bis-(4-methyl-6-tert-butylphenol), 2,2'-methylene-bis-(4-ethyl-6-tert-butylphenol), 4,4'-thio-bis-(3-methyl-6-tert-butylphenol), 4,4'-butylidene-bis-(3-methyl-6-tert-butylphenol), and 3,9-bis[{1,1-dimethyl-2-{R-(3-tert-butyl-4-hydroxy-5-methylphenyl)propionyloxy}ethyl}2,4,9,10-tetraoxaspiro]5,5-undecane.

Examples of the polymer-type phenol-based anti-oxidant may include 1,1,3-tris-(2-methyl-4-hydroxy-5-tert-butylphenyl)butane, 1,3,5-trimethyl-2,4,6-tris(3,5-di-tert-butyl-4-hydroxybenzyl)benzene, tetrakis-{methylene-3-(3',5'-di-tert-butyl-4'-hydroxyphenyl)propionate}methane, bis{(3,3'-bis-4'-hydroxy-3'-tert-butylphenyl)butyric acid}glycol ester, 1,3,5-tris(3', 5'-di-tert-butyl-4'-hydroxybenzyl)-s-triazine-2,4,6-(1H,3H,5H)trione, and tocopherol (vitamin E).

Examples of the sulfur-based anti-oxidant may include dilauryl thiodipropionate, dimyristyl thiodipropionate, and distearyl thiopropionate.

Examples of the phosphite-based anti-oxidant may include triphenyl phosphite, diphenyl isodecyl phosphite, phenyl diisodecyl phosphite, 4,4'-butylidene-bis (3-methyl-6-tert-butylphenyl-di-tridecyl)phosphite, cyclic neopentanetetraylbis(octadecyl phosphite), tris(mono- and/or di-nonylphenyl)phosphite, tris(2,4-di-tert-butylphenyl)phosphite, diisodecyl pentaerythritol diphosphite, 9,10-dihydro-9-oxa-10-phosphaphenanthrene-10-oxide, 10-(3,5-di-tert-butyl-4-hydroxybenzyl)-9, 10-dihydro-9-oxa-10-phosphaphenanthrene-10-oxide, 10-decyloxy-9, 10-dihydro-9-oxa-10-phosphaphenanthrene, cyclic neopentanetetraylbis(2,4-di-tert-butylphenyl)phosphite, cyclic neopentanetetrayl-bis(2,6-di-tert-butylphenyl)phosphite, and 2,2-methylenebis(4,6-tert-butylphenyl) octylphosphite.

In the present transparent adhesive material, a phenol-based and phosphite-based anti-oxidants are preferably used from the viewpoint of the effect of anti-oxidant, thermal stability, economic efficiency, and the like, and it is even more preferable to use both of them in combination since it is possible to enhance the effect as an anti-oxidant as compared to the amount added.

The addition amount of the anti-oxidant is not particularly limited, but it is preferably 0.1 part by mass to 1 parts by mass relative to 100 parts by mass of the resin composition for constituting the intermediate layer, for example, and it is more preferably 0.2 part by mass or more or 0.5 part by mass or less, in particular.

(Weather Resistant Stabilizer)

As the weather resistant stabilizer to impart weather resistance, a hindered amine-based light stabilizer is suitably used. Examples of the hindered amine-based light stabilizer may include succinic acid dimethyl-1-(2-hydroxyethyl)-4-hydroxy-2,2,6,6-tetramethylpiperidine polycondensate, poly[{6-(1,1,3,3-tetramethylbutyl)amino-1, 3,5-triazine-2,4-diyl}{(2,2,6,6-tetramethyl-4-piperidyl)imino}hexamethylene{{2,2,6,6-tetramethyl-4-piperidyl}imino}], N,NT-bis(3-aminopropyl)ethylenediamine-2, 4-bis[N-butyl-N-(1,2,2,6,6-pentamethyl-4-piperidyl) amino]-6-chloro-1,3,5-triazine condensate, bis(2,2,6,6-tetramethyl-4-piperidyl) separate, and 2-(3, 5-di-tert-4-hydroxybenzyl)-2-n-butylmalonic acid bis(1,2,2,6,6-pentamethyl-4-piperidyl).

The addition amount of the weather resistant stabilizer is not particularly limited, but it is preferably 0.01 part by mass or more and 1 part by mass or less, more preferably 0.05 part by mass or more and 0.5 part by mass or less relative to 100 parts by mass of the resin composition for constituting the intermediate layer.

(Processing Aid)

The processing aid can be used for adjustment of the fine stickiness of the intermediate layer or adjustment of flow at the time of heating and melting. For example, it is possible to appropriately select and add paraffin oil, inorganic or organic nanoparticles to the extent at which the transparency is not alienated.

<Outermost Surface Layer>

The outermost surface layer is a layer containing the acrylic polymer (B) and a photocrosslinking initiator, and it is preferably a layer which can exhibit an adhesion property.

Furthermore, the outermost surface layer preferably has higher relative permittivity at a frequency of from 100 kHz to 1 MHz than that of the intermediate layer.

It is sufficient for the acrylic polymer (B) to be an acryl-based polymer which is contained in a known adhesive composition.

In particular, it is preferable to contain, as a main component, a polymer which is obtained by copolymerization of a (meth)acrylic acid ester monomer and/or a vinyl ether monomer having an alkyl group.

It is preferable to use an acrylic-based, particularly, (meth)acrylic acid ester monomer (including a copolymer) as a base polymer.

Examples of the acryl monomer or methacryl monomer which is used for synthesis of a (meth)acrylic acid ester polymer include 2-ethylhexyl acrylate, n-octyl acrylate, n-butyl acrylate, and ethyl acrylate. To those main monomers, a crosslinkable monomer such as hydroxyethyl acrylate, acrylic acid, itaconic acid, glycidyl acrylate, glycidyl methacrylate, methylol acrylamide, or maleic anhydride, or a highly aggregating monomer or a monomer containing functional group such as methyl methacrylate, methyl acrylate, acrylamide, acrylonitrile, methacrylnitrile, vinyl acetate, styrene, fluoroacrylate, or silicone acrylate can be suitable added. Those monomers are polymerized by a known polymerization method such as solution polymerization, emulsion polymerization, bulk polymerization, or suspension polymerization. At that time, a polymerization initiator such as thermal polymerization initiator or photocrosslinking initiator may be used depending on the polymerization method.

(Crosslinking Agent)

The outermost surface layer may be added with a crosslinking agent.

Examples of the crosslinking agent include a (meth)acryl-based crosslinking agent, an isocyanate-based crosslinking agent, and an epoxy-based crosslinking agent, and they may be used either singly or in combination of two or more types thereof. In particular, considering the compatibility with an acryl-based crosslinking agent or the like, it is preferable to use an acryl-based crosslinking agent, and it is more preferable to use an acryl monomer which has weight average molecular weight (Mw) of 5000 or less.

Furthermore, the crosslinking agent is not limited to the (meth)acrylates that are described below, and it is also possible to use appropriately a (meth)acrylate monomer containing an organic functional group, for example.

As for the (meth)acryl-based crosslinking agent, polyfunctional (meth)acrylate such as bifunctional (meth)acrylate, trifunctional (meth)acrylate, or tetrafunctional (meth)acrylate is preferable than monofunctional (meth)

acrylate. Alternatively, a mixture obtained by mixing two or more types of monofunctional to tetrafunctional (meth)acrylate is preferable.

Examples of the monofunctional (meth)acrylate include acrylic acid, (meth)acrylic acids such as methacrylic acid or crotonic acid, lauryl acrylate, 2-ethylhexyl acrylate, 2-hydroxyethyl acrylate, 2-hydroxypropyl acrylate, tetrahydrofurfuryl acrylate, 1,6-hexanediol monoacrylate, and dicyclopentanediene acrylate.

Examples of the bifunctional (meth)acrylate include 1,3-propanediol diacrylate, 1,4-butanediol diacrylate, 1,6-hexanediol diacrylate, 1,9-nonanediol diacrylate, diethylene glycol diacrylate, polyethylene glycol 400 diacrylate, and tripropylene glycol diacrylate.

Examples of the trifunctional (meth)acrylate include triacrylates such as pentaerythritol triacrylate, trimethylol propane triacrylate, trimethylol propane PO modified triacrylate, or trimethylol propane EO modified triacrylate, and trimethacrylate thereof.

Examples of the tetrafunctional (meth)acrylate include ditrimethylol propanetetraacrylate and pentaerythritol tetraacrylate.

Examples of the isocyanate-based crosslinking agent include an isocyanate monomer such as tolylene diisocyanate, chlorophenylene diisocyanate, hexamethylene diisocyanate, tetramethylene diisocyanate, isophorone diisocyanate, xylylene diisocyanate, diphenylmethane diisocyanate, or hydrogenated diphenylmethane diisocyanate, and an isocyanate compound in which those isocyanate monomers are added with trimethylol propane or the like, an isocyanurate compound, a biuret type compound, and also a urethane prepolymer type isocyanate added with known polyether polyol, or polyester polyol, acryl polyol, polybutadiene polyol, polyisoprene polyol, or the like.

Examples of the epoxy-based crosslinking agent include ethylene glycol glycidyl ether, polyethylene glycol diglycidyl ether, glycerin diglycidyl ether, glycerin triglycidyl ether, 1,3-bis(N,N-diglycidyl aminomethyl)cyclohexane, N,N,N',N'-tetraglycidyl-m-xylylene diamine, N,N,N',N'-tetraglycidyl aminophenylmethane, triglycidyl isocyanurate, m-N,N-diglycidyl aminophenyl glycidyl ether, N,N-diglycidyl toluidine, and N,N-diglycidyl aniline. Examples of the aziridine-based crosslinking agent include diphenylmethane-4,4'-bis(1-aziridinecarboxamide), trimethylol propane tri-β-aziridinyl propionate, tetramethylol methane tri-β-aziridinyl propionate, toluene-2,4-bis(1-aziridinecarboxamide), triethylenemelamine, bisisophthaloyl-1-(2-methyl aziridine), tris-1-(2-methyl aziridine)phosphine, and trimethylol propane tri-β-(2methyl aziridine)propionate.

Addition amount of the crosslinking agent is, relative to 100 parts by mass of the base polymer, preferably in the range of 0.5 to 25 parts by mass.

(Photocrosslinking Initiator)

As for the photocrosslinking initiator which is used for the outermost surface layer, any one of the cleave type photocrosslinking initiator and the hydrogen withdrawing type photocrosslinking initiator can be used like the intermediate layer. In particular, the hydrogen withdrawing type photocrosslinking initiator is preferable.

As for the hydrogen withdrawing type photocrosslinking initiator, for example, any one of benzophenone, Michler's ketone, dibenzosuberone, 2-ethyl anthraquinone, and isobutyl thioxanthone and derivatives thereof, or a mixture component consisting of combination of two or more types thereof can be used. However, the photocrosslinking initiator of a hydrogen withdrawing type is not limited to the materials described above. Furthermore, it is also possible to use at various ratios the cleave type photocrosslinking initiator and the hydrogen withdrawing type photocrosslinking initiator in combination.

Content of the photocrosslinking initiator is not particularly limited, and in general it is preferably adjusted within a range of 0.1 to 5 parts by mass relative to 100 parts by mass of the base polymer. However, in view of the balance with other elements, it may be more than this range.

Similar to the intermediate layer, the outermost surface layer may contain an ionomer resin or a tackifying resin, a crosslinking agent, a photocrosslinking initiator, a silane coupling agent, an anti-oxidant, a weather resistant stabilizer, a processing aid or the like. Among them, it is preferable that a crosslinking agent and/or a photocrosslinking initiator are/is contained in the outermost surface layer. Accordingly, for a case in which layering is made with an intermediate layer containing the crosslinking agent and/or the photocrosslinking initiator, an interaction between the 2 layers is caused, thus enabling obtainment of even higher reliability after the attachment.

<Layered Constitution>

The present transparent adhesive material is characterized to have a constitution that it has at least one layer of each of the intermediate layer and the outermost surface layer and it is obtained by layering those layers for integration. By having such layered constitution, not only the electrical characteristics or reliability after attachment but also various characteristics that are required for a transparent adhesive material can be achieved in a balanced manner.

Specific examples of the layered constitution include a 2-layer constitution of intermediate layer/outermost surface layer and a 2-component and 3-layer constitution of outermost surface layer/intermediate layer/outermost surface layer. Furthermore, the layer number may be increased to 4 layers, 5 layers, 6 layers, or 7 layers, if necessary. In particular, to have both the electrical characteristics and various required characteristics like adhesion property or adhesion strength to a subject for adhesion, it is preferable to have a 2-component and 3-layer constitution of outermost surface layer/intermediate layer/outermost surface layer in which the intermediate layer with low permittivity is included.

With regard to the total thickness ratio of the intermediate layer and the outermost surface layer, the value of the intermediate layer (in the case of having two or more layers of the intermediate layer, their total thickness)/the outermost surface layer (in the case of having two or more layers of the outermost surface layer, their total thickness) is preferably 0.05 to 20, more preferably 0.1 or more or 15 or less, and even more preferably 0.5 or more or 12 less. As the value of the intermediate layer/the outermost surface layer is within the above range, various required characteristics can be easily obtained in a balanced manner.

Furthermore, other layers may be also included, and specific examples thereof include a transparent inorganic oxide film layer like $SiO_2$ and $Al_2O_3$, a barrier film layer, and a retardation film layer for display or the like. Furthermore, irrespective of the constitution of a transparent adhesive material, a protective film may be layered on a single surface or both surfaces of a transparent adhesive material.

(Sheet Thickness)

The lower limit of the thickness of the present transparent adhesive material is preferably 10 μm or more, more preferably 30 μm or more, and even more preferably 50 μm or more. The upper limit is preferably 1 mm or less, more preferably 500 μm or less, and even more preferably 250 μm or less.

By reducing the sheet thickness, it is possible to respond the requirement for having thinning. However, if the thickness is reduced excessively, for example, it is believed that there is a possibility of having an occurrence of air bubbles around steps with different height when there are irregularities on a surface of a member for attachment.

<Characteristics of the Present Transparent Adhesive Material>

(Relative Permittivity)

For carrying out attachment between a member for constituting an optical device provided with a touch panel function and a transparent adhesive material, in particular, when an adhesive sheet is used for attachment between layers with touch panel function or attachment between a layer provided with a touch panel function and a surface protecting member, the adhesive sheet is required to have a function of an insulating layer. From the viewpoint of reducing a loss of an electric signal with high frequency like touch signal, the adhesive material is required to have low relative permittivity.

From this point of view, the present transparent adhesive material has relative permittivity of preferably 3.3 or less, more preferably 3.0 or less, and even more preferably 2.8 or less at a frequency of from 100 kHz to 1 MHz.

Furthermore, the present transparent adhesive material has relative permittivity of preferably 3.0 or less, and more preferably 2.8 or less at a frequency of 1 MHz.

Also with regard to a low frequency region, lower relative permittivity can allow even higher function of an insulating layer. Namely, it is preferable to have lower frequency dependency of relative permittivity. From this point of view, the difference ($\varepsilon$(1 MHz)–$\varepsilon$(1 kHz)) between relative permittivity at a frequency of 1 kHz ($\varepsilon$(1 MHz)) and relative permittivity at a frequency of 1 MHz ($\varepsilon$(1 kHz)) of the adhesive material is preferably 1.5 or less, more preferably 1.0 or less, and even more preferably 0.8 or less. As the $\varepsilon$(1 MHz)–$\varepsilon$(1 kHz) is 1.5 or less, more stabilized electrical characteristics can be exhibited in a broad frequency range.

Furthermore, having a little difference ($\varepsilon$(1 MHz)–$\varepsilon$(1 kHz)) between the relative permittivity at a frequency of 1 kHz ($\varepsilon$(1 MHz)) and the relative permittivity at a frequency of 1 MHz ($\varepsilon$(1 kHz)) means less frequency dependency of the relative permittivity, and thus it is expected that stable electrical characteristics are exhibited in a broad frequency range.

To have the production such that $\varepsilon$(1 MHz)–$\varepsilon$(1 kHz) is within the above range, for example, it is sufficient that the olefinic polymer (A) is used as a base resin of the intermediate layer to have low permittivity. If an acryl-based polymer is used to have low permittivity, $\varepsilon$(1 MHz)–$\varepsilon$(1 kHz) of higher than 1.5 is obtained.

(Holding Property)

For a case of attaching an adhesive material to a member for constituting an optical device provided with a touch panel function, for example, it is necessary to have a height difference absorbing property at sufficient level, in particular when attachment is made with a member having print height difference. However, it may easily become a characteristic that is contradictory to the storage stability during storage of an adhesive material, in particular, during storage in the form of a roll. In this regard, by having the holding property of the adhesive material in a predetermined value range, those physical properties may be obtained in a balanced manner. Furthermore, by having the layered constitution, the above physical properties and other various physical properties that are derived from electrical characteristics can be obtained in a balanced manner.

From this point of view, the lower limit of the deviation amount of the present transparent adhesive material according to a holding test including a constitution of SUS plate/adhesive material (25×20 mm)/PET, a load of 0.5 kg, a temperature of 40° C., and a time of 30 minutes is preferably 0.2 mm or more, and more preferably 0.5 mm or more. Furthermore, the upper limit is preferably 20 mm or less, and more preferably 15 mm or less.

When the deviation amount is excessively small, a sufficient print height difference is not obtained, air bubbles may occur during an attachment process, or the reliability after the attachment is lowered. On the other hand, when it is excessively high, the end part of the sheet may slip during storage so that poor long-term storage stability is yielded.

(Adhesion Property)

To have a good handling property when the present transparent adhesive material is attached to a member, it is necessary to have adhesion property at certain level after the material is roll-pressed at room temperature.

From this point of view, when the present transparent adhesive material is roll-pressed according to one reciprocation of 2 kg roll on a soda lime glass and then removed by 180° peeling at 60 mm/min and 23° C., the peeling force is preferably 0.5 N/10 mm or more, and more preferably 1 N/10 mm or more. If the peeling force is excessively low, that is, the adhesion property is low, it is difficult to peel a release film from the present transparent adhesive material, for example, in the case of a constitution in which the present transparent adhesive material and a release film are layered.

(Peeling Force)

When one surface of the present transparent adhesive material is applied and pressed on a soda lime glass and then removed at peeling rate of 60 mm/min at 23° C., the 180° peeling force is preferably 2 N/10 mm or more, more preferably 4 N/10 mm or more, and even more preferably 6 N/10 mm or more.

As the peeling force is within the defined range, it is possible to provide the present transparent adhesive material with sufficient reliability when the present transparent adhesive material is attached to a subject for attachment.

(Haze)

The present transparent adhesive material has a characteristic of being transparent, and thus it is distinguished from a non-transparent material like a foamed resin sheet, for example. Specifically, when both surfaces of the present transparent adhesive material are sandwiched with a soda lime glass (thickness of 0.5 mm) and then haze is measured according to JIS K7136, it is preferable that the haze is 5% or less. More preferably, the haze is 2% or less, and even more preferably 1% or less.

(Water Vapor Permeability)

It is preferable that the present transparent adhesive material has, when calculated in terms of the thickness of 150 μm, water vapor permeability of 300 g/m$^2$/day or less at 40° C. and 90% RH from the viewpoint of suppressing introduction of moisture from an outside, protecting an optical device or a peripheral member, and enhancing the reliability. In particular, it is more preferably 150 g/m$^2$/day or less, and even more preferably 100 g/m$^2$/day or less.

Furthermore, in order for the present transparent adhesive material to have water vapor permeability of 300 g/m$^2$/day or less, it is possible that a resin with relatively high water vapor permeability like an ethylene-α-olefin copolymer and a styrene-based elastomer is selected as the olefinic polymer (A) or the thickness ratio of the intermediate layer and the outermost surface layer or the layer configuration may be adjusted. However, it is not intended to be limited to those methods.

[Method for Producing Transparent Adhesive Sheet]

As the method for producing a transparent adhesive sheet, it is possible to employ a known method, for example, an extrusion casting method, a calendering method, or an inflation method which has melting and mixing equipment such as a single-screw extruder, a multi-screw extruder, the Banbury mixer, or a kneader and uses a T-die, and they are not particularly limited. Among them, for the present transparent adhesive material, the extrusion casting method is preferably used from the viewpoint of handling properties, productivity, or the like.

The molding temperature in the extrusion casting method using a T-die is appropriately adjusted depending on the flow characteristics, film-forming properties, or the like of the resin composition to be used, but it is preferably from 80 to 230° C., and more preferably from 90 to 160° C.

The method for layering each layer constituting a transparent adhesive sheet is not particularly limited, and a method well known in the field may be used. For example, there is a coextrusion method in which, after performing layering to a film shape by using a feed block or a multi-manifold die, cold pressing is performed using a chilled roll to have layering, an extrusion lamination method in which, by using an extruder, a resin composition is melt and extruded into a film shape using a T die or the like placed on the tip of an extruder and layered on a surface of a resin composition which is previously formed as a sheet-shaped film, and a heat lamination method in which, after performing the layering like the extrusion lamination method, pressing under heating and adhesion are performed by using a dielectric roll. Among those methods, it is preferable that the layering is performed by a coextrusion method. As the layering is made in a melt state using a coextrusion method, the interface strength between each layer can be stabilized.

Furthermore, in a case in which an extrusion lamination method or a heat lamination method is used, it is preferable that the adhesive layer is pressed after it is first layered on a surface of a release film.

When various kinds of additives such as the silane coupling agent, the anti-oxidant, and the weather resistant stabilizer are used, they may be supplied after being blended in advance together with the resin, or all of the materials may be melted and mixed in advance and then supplied, or only the additives may be concentrated in the resin to prepare a master batch in advance and then supplied.

In addition, it is preferable to layer a protective film on one surface or both surfaces of the transparent adhesive material from the viewpoint of preventing blocking between sheets or foreign matter adhesion. Alternatively, embossing processing or various kinds of unevenness (a cone shape, a pyramid shape, a hemispherical shape, or the like) processing may be carried out, if necessary. In addition, the surface of the transparent adhesive material may be subjected to various kinds of surface treatments such as a corona treatment, a plasma treatment, and a primer treatment for the purpose of improving the adhesion property to various kinds of subject for adhesion.

[Layered Body for Constituting Optical Device]

The present transparent adhesive material can be formed into a layered body for constituting an optical device by layering a member which constitutes an optical device on at least one surface thereof, and an optical device can be produced using the layered body for constituting an optical device.

For example, by forming a layered body for constituting an optical device according to attachment of the present transparent adhesive material and a member which constitutes an optical device followed by light irradiation from the side of the member which constitutes an optical device for photocrosslinking the intermediate layer and the outermost surface layer, a layered body for constituting an optical device can be produced.

Examples of the light to irradiate may include ionizing radiation such as α rays, β rays, γ rays, neutron rays, and electron beams, ultraviolet light, and visible light, and among them, ultraviolet light is preferable. In addition, the irradiating energy, irradiating time, and light irradiating method are not particularly limited, and the photocrosslinking may be carried out by activating the photocrosslinking initiator.

Furthermore, according to light irradiation of the present transparent adhesive material, a transparent adhesive material having an outermost surface layer containing a photoreaction product of the acrylic polymer (B) and an intermediate layer, which is adjacent to the outermost surface layer, containing a photoreaction product of the olefinic polymer (A) can be formed, for example.

Furthermore, the present transparent adhesive material after light irradiation has relative permittivity of 3.3 or less at a frequency of from 100 kHz to 1 MHz as described above. In particular, it may be 3.0 or less, or more particularly 2.8 or less. Furthermore, the water vapor permeability is, when calculated in terms of the thickness of 150 μm, 300 g/m$^2$/day or less at 40° C. and 90% RH as described above. In particular, it may be 150 g/m$^2$/day or less, or more particularly 100 g/m$^2$/day or less. The haze measured according to JIS K7136 can be preferably 5% or less, more preferably 2% or less, and even more preferably 1% or less.

Accordingly, by using the present transparent adhesive material after light irradiation and a member which constitutes an optical device, an optical device or a member for constituting an optical device can be produced. For example, as the present transparent adhesive material after light irradiation is layered with a member which constitutes an optical device and light is irradiated on the transparent adhesive material over the member which constitutes an optical device, the transparent adhesive material is subjected to crosslinking and an optical device can be also produced.

As the member which constitutes an optical device, a layered body consisting of any one kind or a combination of two or more kinds selected from the group consisting of a touch panel, an image display panel, a front surface protective panel, a retardation film, and a polarizing film can be formed. The layered body as a layered body for constituting an optical device can be used for producing an optical device.

Furthermore, as the member which constitutes an optical device, a layered body consisting of any one kind or a combination of two or more kinds selected from the group consisting of a solar cell, a back surface protective panel, and a front surface protective panel can be formed. The layered body can be used as a member for constituting a solar cell module.

Furthermore, as the member which constitutes an optical device, a layered body consisting of any one kind or a combination of two or more kinds selected from the group consisting of a front surface protective substrate, an organic EL element, and a back surface protective substrate can be formed. The layered body can be used as a member for constituting an organic EL element.

<Description of Terms>

In the invention, in a case in which it is expressed as "X to Y" (X and Y are an arbitrary number, respectively), it also encompasses the meaning "preferably greater than X" or "preferably less than Y" as well as the meaning "X or more and Y or less" unless otherwise stated.

In addition, in a case in which it is expressed as "X or more" (X is an arbitrary number) or "Y or less" (Y is an arbitrary number), it also encompasses the meaning of "preferably greater than X" or "preferably less than Y".

In general, the "sheet" refers to a thin flat product having a relatively small thickness compared to the length and width according to the definition by JIS, and generally the "film" refers to a thin flat product which has an extremely small thickness compared to the length and width and of which the maximum thickness is arbitrarily limited, and is typically provided in the form of a roll (Japanese Industrial Standards JIS K6900). For example, with regard to the thickness, those having 100 μm or more are referred to as a sheet and those having less than 100 μm are referred to as a film in narrow sense. However, the boundary between the sheet and the film is not clear and it is not required to distinguish the two in words in the invention, and thus it is intended to include the "sheet" even when referred to as the "film" and to include the "film" even when referred to as the "sheet" in the invention.

EXAMPLES

Hereinbelow, the invention will be described in more detail with reference to Examples. However, it is evident that the invention is not limited by Examples.

[Composition 1 for forming Intermediate Layer]

To 1 kg of ethylene-butene random copolymer A-1 (density: 870 kg/m$^3$, weight average molecular weight (Mw): 100,000, MFR (190° C., 21.18 N): 35 g/10 min, relative permittivity at 100 kHz: 2.3, relative permittivity at 1 MHz: 2.3), butene content: 14% by mol, crystal fusion peak temperature: 55° C., crystal fusion heat: 53 J/g) as the olefinic polymer (A), 50 g of silane modified ethylene-octene random copolymer A-3 (density: 868 kg/m$^3$, melting point: 54° C., MFR (190° C., 21.18 N): 1.7 g/10 min, weight average molecular weight (Mw): 250,000, relative permittivity at 100 kHz: 2.3, relative permittivity at 1 MHz: 2.3), 30 g of isobornyl methacrylate (manufactured by SHIN-NAKAMURA CHEMICAL CO., LTD., NK Ester IB) and 20 g of 1,10-decanediol dimethacrylate (manufactured by SHIN-NAKAMURA CHEMICAL CO., LTD., NK Ester DOD-N) as a crosslinking agent, and 15 g of a mixture of 2,4,6-trimethyl benzophenone and 4-methyl benzophenone (manufactured by Lanberti S.p.A., ESACURE TZT) as a photocrosslinking initiator were added to prepare a composition 1 for forming an intermediate layer.

The composition 1 for forming an intermediate layer had 130° C. melt viscosity of 9.9×10$^2$ Pa·s, relative permittivity of 2.3 at a frequency of 100 kHz, and relative permittivity of 2.3 at a frequency of 1 MHz.

[Composition 2 for forming Intermediate Layer]

By mixing 1 kg of A-1 as the olefinic polymer (A) with 30 g of isobornyl methacrylate and 20 g of 1,10-decanediol dimethacrylate as a crosslinking agent, and 15 g of a mixture of 2,4,6-trimethyl benzophenone and 4-methyl benzophenone as a photocrosslinking initiator, a composition 2 for forming an intermediate layer was prepared.

The composition 2 for Forming an intermediate layer had 130° C. melt viscosity of 5.7×10$^2$ Pa·s, relative permittivity of 2.3 at a frequency of 100 kHz, and relative permittivity of 2.3 at a frequency of 1 MHz.

[Composition 3 for Forming Intermediate Layer]

By using 1 kg of A-1 as the olefinic polymer (A) and without mixing with a crosslinking agent and a photocrosslinking initiator, a composition 3 for forming an intermediate layer was prepared.

The composition 3 for forming an intermediate layer had 130° C. melt viscosity of 6.0×10$^2$ Pa·s, relative permittivity of 2.3 at a frequency of 100 kHz, and relative permittivity of 2.3 at a frequency of 1 MHz.

[Composition 4 for Forming Intermediate Layer]

To 1 kg of ethylene-butene random copolymer A-2 (density: 864 kg/m$^3$, MFR (190° C., 21.18 N): 3.6 g/10 min, weight average molecular weight (Mw): 200,000, relative permittivity at 100 kHz: 2.3, relative permittivity at 1 MHz: 2.3), butene content: 16% by mol, crystal fusion peak temperature: 40° C., crystal fusion heat: 45 J/g), 30 g of isobornyl methacrylate and 20 g of 1,10-decanediol dimethacrylate as a crosslinking agent, and 15 g of a mixture of 2,4,6-trimethyl benzophenone and 4-methyl benzophenone as a photocrosslinking initiator were added to prepare a composition 5 for forming an intermediate layer.

The composition 4 for forming an intermediate layer had 130° C. melt viscosity of 6.4×10$^3$ Pa·s, relative permittivity of 2.3 at a frequency of 100 kHz, and relative permittivity of 2.3 at a frequency of 1 MHz.

[Composition 1 for Forming Outermost Surface Layer]

To 1 kg of acrylic acid ester copolymer B-1 (weight average molecular weight (Mw): 400,000) obtained by random copolymerization of 77 parts by mass of 2-ethylhexyl acrylate, 19 parts by mass of vinyl acetate, and 4 parts by mass of acrylic acid, 20 g of isobornyl methacrylate (Mw: 222) and 15 g of a photocrosslinking initiator (manufactured by Lanberti S.p.A., ESACURE TZT) consisting of a mixture of 2,4,6-trimethyl benzophenone and 4-methyl benzophenone were added to prepare a composition 1 for forming an outermost surface layer.

The composition 1 for forming an outermost surface layer had 130° C. melt viscosity of 2.4×10$^2$ Pa·s, relative permittivity of 3.5 at a frequency of 100 kHz, and relative permittivity of 3.2 at a frequency of 1 MHz.

[Composition 2 for Forming Outermost Surface Layer]

To 1 kg of acrylic acid ester copolymer B-1 (weight average molecular weight (Mw): 400,000), 15 g of a mixture of 2,4,6-trimethyl benzophenone and 4-methyl benzophenone as a photocrosslinking initiator was added to prepare a composition 2 for forming an outermost surface layer.

The composition 2 for forming an outermost surface layer had 130° C. melt viscosity of 2.8×10$^2$ Pa·s, relative permittivity of 3.5 at a frequency of 100 kHz, and relative permittivity of 3.2 at a frequency of 1 MHz.

[Composition 3 for Forming Outermost Surface Layer]

To 1 kg of acrylic acid ester copolymer B-1 (weight average molecular weight (Mw): 400,000) obtained by random copolymerization of 77 parts by mass of 2-ethylhexyl acrylate, 19 parts by mass of vinyl acetate, and 4 parts by mass of acrylic acid, 20 g of 1,10-decanediol dimethacrylate (Mw: 310) as a crosslinking agent and 15 g of a mixture of 2,4,6-trimethyl benzophenone and 4-methyl benzophenone as a photocrosslinking initiator were added to prepare the composition 1 for forming an outermost surface layer.

The composition 1 for forming an outermost surface layer had 130° C. melt viscosity of 2.5×10$^2$ Pa·s, relative permittivity of 3.5 at a frequency of 100 kHz, and relative permittivity of 3.2 at a frequency of 1 MHz.

Example 1

The composition 1 for forming an outermost surface layer/the composition 1 for forming an intermediate layer/the composition 1 for forming an outermost surface layer were coextruded at 130° C. to have a sheet shape such that each layer has thickness of 37.5 μm/75 μm/37.5 μm. After that, both surfaces of the sheet were covered with two pieces of a polyethylene terephthalate film which has been subjected to a peeling treatment (DIAFOIL MRA manufactured by Mitsubishi Plastics, Inc., thickness of 100 μm, and DIAFOIL MRF75 manufactured by Mitsubishi Plastics, Inc., thickness of 75 μm). After that, on both surfaces via the releasing PET, ultraviolet rays of 365 nm were irradiated to have cumulative light amount of 1000 mJ/cm$^2$ by using a high pressure mercury lamp. As a result, a transparent adhesive sheet (thickness of 150 μm) was produced.

Example 2

The composition 2 for forming an outermost surface layer/the composition 2 for forming an intermediate layer/the composition 2 for forming an outermost surface layer were coextruded at 130° C. to have a sheet shape such that each layer has thickness of 37.5 μm/75 μm/37.5 μm. After that, both surfaces of the sheet were covered with two pieces of a polyethylene terephthalate film which has been subjected to a peeling treatment (DIAFOIL MRA and DIAFOIL MRF75). After that, on both surfaces via the releasing PET, ultraviolet rays of 365 nm were irradiated to have cumulative light amount of 1000 mJ/cm$^2$ by using a high pressure mercury lamp. As a result, a transparent adhesive sheet (thickness of 150 μm) was produced.

Example 3

The composition 3 for forming an outermost surface layer/the composition 2 for forming an intermediate layer/the composition 3 for forming an outermost surface layer were coextruded at 130° C. to have a sheet shape such that each layer has thickness of 60 μm/30 μm/60 μm. After that, both surfaces of the sheet were covered with two pieces of a polyethylene terephthalate film which has been subjected to a peeling treatment (DIAFOIL MRA and DIAFOIL MRF75). After that, on both surfaces via the releasing PET, ultraviolet rays of 365 nm were irradiated to have cumulative light amount of 1000 mJ/cm$^2$ by using a high pressure mercury lamp. As a result, a transparent adhesive sheet (thickness of 150 μm) was produced.

Comparative Example 1

The composition 2 for forming an outermost surface layer/the composition 3 for forming an intermediate layer/the composition 2 for forming an outermost surface layer were coextruded at 130° C. to have a sheet shape such that each layer has thickness of 37.5 μm/75 μm/37.5 μm. After that, both surfaces of the sheet were covered with two pieces of a polyethylene terephthalate film which has been subjected to a peeling treatment (DIAFOIL MRA and DIAFOIL MRF75). After that, on both surfaces via the releasing PET, ultraviolet rays of 365 nm were irradiated to have cumulative light amount of 1000 mJ/cm$^2$ by using a high pressure mercury lamp. As a result, a transparent adhesive sheet (thickness of 150 μm) was produced.

Comparative Example 2

The composition 2 for forming an outermost surface layer/the composition 4 for forming an intermediate layer/the composition 2 for forming an outermost surface layer were coextruded at 130° C. to have a sheet shape such that each layer has thickness of 37.5 μm/75 μm/37.5 μm. After that, both surfaces of the sheet were covered with two pieces of a polyethylene terephthalate film which has been subjected to a peeling treatment (DIAFOIL MRA and DIAFOIL MRF75). After that, on both surfaces via the releasing PET, ultraviolet rays of 365 nm were irradiated to have cumulative light amount of 1000 mJ/cm$^2$ by using a high pressure mercury lamp. As a result, a transparent adhesive sheet (thickness of 150 μm) was produced.

Comparative Example 3

Only the composition 1 for forming an intermediate layer was formed into a sheet shape such that it has thickness of 150 μm. After that, both surfaces of the sheet were covered with two pieces of a polyethylene terephthalate film which has been subjected to a peeling treatment (DIAFOIL MRA and DIAFOIL MRF75) to produce a transparent adhesive sheet (thickness of 150 μm).

<Evaluation>

The following physical properties were evaluated for the transparent adhesive sheets obtained from above Examples and Comparative Examples.

(Adhesion Property)

The sheet produced in each of Examples and Comparative Examples was roll-pressed according to one reciprocation of a 2 kg roll on a soda lime glass, and then the peeling force at the time of removal by 180° peeling at 60 mm/min and 23° C. was immediately measured.

The sheet with less than 0.5 N/10 mm was determined as "X" and the sheet with 0.5 N/10 mm or more was determined as "O".

(Peeling Force)

The release film on one surface of the sheet produced in each of Examples and Comparative Examples was peeled and then attached with a 50 μm PET film (DIAFOIL T100 manufactured by Mitsubishi Plastics, Inc., 50 μm) as a backing film. The layered product was cut to have a length of 150 mm and a width of 10 mm. After that, the remaining release film was peeled off, and then the adhesive surface exposed by peeling was roll-pressed on a soda lime glass. The attached product was subjected to an autoclave treatment (80° C., gauge pressure of 0.3 MPa, 20 minutes) for finishing adhesion. The resulting sample was irradiated from the PET film surface side with ultraviolet rays of 365 nm to have cumulative light amount of 2000 mJ/cm$^2$ by using a high pressure mercury lamp. According to aging for 15 hours at 23° C. and 50% RH, a sample for measuring adhesion force was prepared.

The peeling force (N/10 mm) was then measured when the sample is removed at peeling angle of 180° and peeling rate of 60 mm/min.

(Relative Permittivity)

The release film on one side of the sheet produced in each of Examples and Comparative Examples was peeled and then roll-pressed to a SUS plate. After that, by performing an autoclave treatment (80° C., gauge pressure of 0.3 MPa, 20 minutes), the sheet was adhered. Next, after peeling the remaining release film followed by roll-press of an aluminum foil of 45 mmφ, a sample for measuring relative permittivity was prepared. At that time, for Comparative Example 3, the release film on both sides was removed, and according to vacuum vapor deposition of the aluminum electrode to have 45 mmφ on both surfaces of the sheet, a sample for measuring relative permittivity was prepared.

By using the sample for measuring relative permittivity, the relative permittivity at 23° C., 50% RH, and a frequency of from 1 kHz to 1 MHz was measured based on JIS C2138 by using a LCR meter (HP4284A manufactured by Agilent Technologies, Inc.).

(Haze)

The release film of the sheet was peeled in order and the sheet was subjected to roll-attachment on the front and back surfaces of a soda lime glass (82 mm×53 mm×0.5 mm thickness). The attached product was subjected to an autoclave treatment (80° C., gauge pressure of 0.3 MPa, 20 minutes) for finishing adhesion. Then, the sheet was irradiated with ultraviolet rays of 365 nm to have cumulative light amount of 2000 mJ/cm$^2$ by using a high pressure mercury lamp. According to aging for 15 hours at 23° C. and 50% RH, a sample for measuring optical characteristics was prepared. For the sample, the haze value based on JIS K7136 was obtained by using a haze meter (NDH5000 manufactured by NIPPON DENSHOKU INDUSTRIES Co., LTD.).

interlayer strength was significantly lowered, and during the peeling test, peeling easily occurred between the layers even by weak force.

In Comparative Example 2, the intermediate layer has high melt viscosity and also the difference in melt viscosity of the outermost surface layer is very high, and thus a sufficient interface adhesion property cannot be obtained at the time of layering the intermediate layer and the outermost surface layer, and similar to Comparative Example 1, peeling easily occurred between the layers even by weak force during the peeling test.

In Comparative Example 3, the composition for intermediate layer was used as monolayer so that, as an adhesive sheet, the adhesion property at room temperature was insufficient, and also as an adhesive sheet, the handling property was poor.

According to the above Examples and Comparative Examples as well as the results of the test which has been carried out until now by the present inventors, with regard to the transparent adhesive material provided with an outermost surface layer containing an acrylic polymer (B) and a photocrosslinking initiator, and an intermediate layer containing an olefinic polymer (A), a crosslinking agent, and a photocrosslinking initiator, if the intermediate layer contains a (meth)acrylate monomer as the crosslinking agent and has relative permittivity of 3.0 or less at a frequency of from 100

| | | | Example 1 | | Example 2 | | Example 3 | | Comparative Example 1 | | Comparative Example 2 | | Comparative Example 3 |
|---|---|---|---|---|---|---|---|---|---|---|---|---|---|
| | | | Intermediate layer | Surface layer | Intermediate layer | Surface layer | Intermediate layer | Surface layer | Intermediate layer | Surface layer | Intermediate layer | Surface layer | Monolayer |
| Composition | (A) Olefin-based | A-1 | 100 | | 100 | | 100 | | 100 | | | | 100 |
| | | A-2 | | | | | | | | | 100 | | |
| | | A-3 | 5 | | | | | | | | | | 5 |
| | | A-4 | | | | | | | | | | | |
| | (B) Acryl-based | B-1 | | 100 | | 100 | | 100 | | 100 | | 100 | |
| | Crosslinking agent | IB | 3 | 2 | 3 | | 3 | | | | 3 | | 3 |
| | | DOD-N | 2 | | 2 | | 2 | 2 | | | 2 | | 2 |
| | UV initiator | TZT | 1.5 | 1.5 | 1.5 | 1.5 | 1.5 | 1.5 | | 1.5 | 1.5 | 1.5 | 1.5 |
| 130° C. Melt viscosity η | Pa·s | | 990 | 240 | 570 | 280 | 570 | 250 | 600 | 280 | 6400 | 280 | 990 |
| ηa/ηb | — | | | 4.1 | | 2 | | 2.3 | | 2.1 | | 22.9 | — |
| Adhesion property | 23° C. Roll press | | ○ | | ○ | | ○ | | ○ | | ○ | | X |
| Peeling force | N/10 mm | | 11 | | 5 | | 9 | | 1 | | 1 | | 18 |
| Relative permittivity ε | 1 kHz | | 3.0 | | 3.0 | | 4.1 | | 3.7 | | 3.0 | | 2.3 |
| | 100 kHz | | 2.8 | | 2.8 | | 3.3 | | 3.4 | | 2.8 | | 2.3 |
| | 1 MHz | | 2.6 | | 2.6 | | 2.9 | | 3.2 | | 2.6 | | 2.3 |
| ε (1 kHz)-ε (1 MHz) | | | 0.4 | | 0.4 | | 1.2 | | 0.5 | | 0.4 | | 0 |
| Water vapor permeability | g/m$^2$/day #150 | Cup method | ◎ (35) | | ◎ (34) | | ○ (105) | | ◎ (34) | | ◎ (32) | | ◎ (19) |
| Haze | (%) #150 | | 0.4 | | 0.4 | | 0.3 | | 0.9 | | 0.3 | | 0.8 |

The sheets produced in Examples 1 to 3 were found to have excellent dielectric characteristics while they satisfy the adhesion property, peeling force, optical characteristics, and the like that are required for a transparent adhesive sheet.

On the other hand, since no crosslinking agent or photocrosslinking initiator is used in the intermediate layer of Comparative Example 1, diffusion and permeation of the crosslinking agent contained in the intermediate layer, a reaction between the crosslinking agent contained in the intermediate layer and the resin composition constituting the outermost surface layer, or the like did not occur, and an interaction between the intermediate layer and the outermost surface layer was also was unlikely to occur. Thus, the kHz to 1 MHz, and also the 130° C. melt viscosity of the resin composition which constitutes the outermost surface layer and the intermediate layer is 5×10$^1$ to 5×10$^3$ Pa·s and the ratio $\eta_a/\eta_b$ of the melt viscosity $\eta_a$ of the outermost surface layer and the melt viscosity $\eta_b$ of the intermediate layer is 0.05 to 20, it can be considered that low relative permittivity and excellent adhesion characteristics can be obtained and also the intermediate layer and the outermost surface layer can be suitably integrated.

The invention claimed is:

1. A photocrosslinkable transparent adhesive material comprising:
   an outermost surface layer comprising an acrylic polymer (B) and a photocrosslinking initiator; and an intermediate layer comprising an olefinic polymer (A), a crosslinking agent, and a photocrosslinking initiator, wherein the intermediate layer comprises the crosslinking agent within a range of 1 to 50 parts by mass relative to 100 parts by mass of the olefinic polymer, and a (meth)acrylate monomer as the crosslinking agent.

2. The photocrosslinkable transparent adhesive material according to claim 1, wherein each of 130° C. melt viscosity $\eta_a$, of a resin composition which constitutes the outermost surface layer and 130° C. melt viscosity $\eta_b$ of a resin composition which constitutes the intermediate layer is $5 \times 10^1$ to $5 \times 10^3$ Pa·s and a ratio $\eta_a/\eta_b$ is 0.05 to 20.

3. The photocrosslinkable transparent adhesive material according to claim 1, wherein a concentration of the (meth)acrylate monomer in the intermediate layer is higher than a concentration of the (meth)acrylate monomer in the outermost surface layer.

4. The photocrosslinkable transparent adhesive material according to claim 1, wherein an weight average molecular weight (Mw) of the acrylic polymer (B) is 100,000 to 800,000 and an weight average molecular weight (Mw) of the olefinic polymer (A) is 50,000 to 400,000.

5. The photocrosslinkable transparent adhesive material according to claim 1, wherein the olefinic polymer (A) is selected from the group consisting of an ethylene-α-olefin copolymer, a styrene-based elastomer, a polyisobutylene resin, and a mixture resin of two or more types thereof.

6. The photocrosslinkable transparent adhesive material according to claim 1, wherein the intermediate layer has relative permittivity of 3.0 or less at a frequency of from 100 kHz to 1 MHz.

7. The photocrosslinkable transparent adhesive material according to claim 2, wherein a concentration of the (meth)acrylate monomer in the intermediate layer is higher than a concentration of the (meth)acrylate monomer in the outermost surface layer.

8. The photocrosslinkable transparent adhesive material according to claim 2, wherein an weight average molecular weight (Mw) of the acrylic polymer (B) is 100,000 to 800,000 and an weight average molecular weight (Mw) of the olefinic polymer (A) is 50,000 to 400,000.

9. The photocrosslinkable transparent adhesive material according to claim 2, wherein the olefinic polymer (A) is selected from the group consisting of an ethylene-α-olefin copolymer, a styrene-based elastomer, a polyisobutylene resin, and a mixture resin of two or more types thereof.

10. The photocrosslinkable transparent adhesive material according to claim 2, wherein the intermediate layer has relative permittivity of 3.0 or less at a frequency of from 100 kHz to 1 MHz.

11. The photocrosslinkable transparent adhesive material according to claim 3, wherein an weight average molecular weight (Mw) of the acrylic polymer (B) is 100,000 to 800,000 and an weight average molecular weight (Mw) of the olefinic polymer (A) is 50000 to 400,000.

12. The photocrosslinkable transparent adhesive material according to claim 3, wherein the olefinic polymer (A) is selected from the group consisting of an ethylene-α-olefin copolymer, a styrene-based elastomer, a polyisobutylene resin, and a mixture resin of two or more types thereof.

13. A transparent adhesive material layered body comprising:
a release film; and
the photocrosslinkable transparent adhesive material according to claim 1 provided on the release film.

14. A layered body for an optical device, comprising:
a member Which constitutes an optical device: and
the photocrosslinkable transparent adhesive material according to claim 1 provided on the member.

15. A method for producing a layered body for an optical device, the method comprising:
preliminarily irradiating the photocrosslinkable transparent adhesive material according to claim 1 to preliminary cure the photocrosslinkable transparent adhesive material;
attaching the transparent adhesive material after the preliminary irradiating to a member which constitutes an optical device; and
irradiating the photocrosslinkable transparent adhesive material with light over the member to cure the photocrosslinkable transparent adhesive material.

* * * * *